(12) United States Patent
George

(10) Patent No.: US 7,664,891 B2
(45) Date of Patent: Feb. 16, 2010

(54) MODULAR DATA TRANSFER ARCHITECTURE

(75) Inventor: Varghese George, Walnut Creek, CA (US)

(73) Assignee: STMicroelectronics Inc., Carrollton, TX (US)

(*) Notice: Subject to any disclaimer, the term of this patent is extended or adjusted under 35 U.S.C. 154(b) by 636 days.

(21) Appl. No.: 11/005,926

(22) Filed: Dec. 6, 2004

(65) Prior Publication Data

US 2006/0123154 A1 Jun. 8, 2006

(51) Int. Cl.
*G06F 13/00* (2006.01)
(52) U.S. Cl. .................. 710/33; 710/3; 710/9; 326/47; 326/41
(58) Field of Classification Search .......... 326/47, 326/41; 710/3, 9, 33
See application file for complete search history.

(56) References Cited

U.S. PATENT DOCUMENTS

| | | | |
|---|---|---|---|
| 5,377,182 A * | 12/1994 | Monacos | 370/219 |
| 6,292,016 B1 * | 9/2001 | Jefferson et al. | 326/39 |
| 6,870,396 B2 * | 3/2005 | Lien et al. | 326/41 |
| 7,049,846 B1 * | 5/2006 | Kundu | 326/41 |
| 7,058,921 B1 * | 6/2006 | Hwang et al. | 716/17 |
| 7,137,095 B1 * | 11/2006 | Liu et al. | 716/12 |
| 7,173,912 B2 * | 2/2007 | Jaber et al. | 370/254 |
| 2004/0232942 A1 * | 11/2004 | Kundu et al. | 326/39 |
| 2005/0203988 A1 * | 9/2005 | Nollet et al. | 709/201 |
| 2006/0006905 A1 * | 1/2006 | Chou et al. | 326/40 |
| 2007/0075742 A1 * | 4/2007 | Feng et al. | 326/41 |
| 2009/0106531 A1 * | 4/2009 | Kundu et al. | 712/32 |

OTHER PUBLICATIONS

Liang, "An Architecture and Compiler for Scalable On-Chip Communication" Nov. 7, 2004, IEEE, pp. 711-716.*

* cited by examiner

*Primary Examiner*—Niketa Patel
*Assistant Examiner*—Ernest Unelus
(74) *Attorney, Agent, or Firm*—Lisa K. Jorgenson; Andre M. Szuwalski

(57) ABSTRACT

A system on chip (SoC) integrated circuit includes a plurality of computational blocks. A modular data transfer architecture interconnects the computational blocks for intra-chip communications. The computational blocks include an initiator block and a target block, with the initiator block originating a data communication having a global address associated with the target block. The modular data transfer architecture includes a first peripheral module having an initiator port connected to the initiator block to receive the data communication and a second peripheral module having a target port connected to the target block. A first port mapper within the first peripheral module maps the global address to a first peripheral module target port along a data path towards the second peripheral module. A second port mapper within the second peripheral module maps the global address to the target port connected to the target block. The modular data transfer architecture further includes a plurality of internal modules support intra-chip communications. Each internal module has a plurality of initiator ports connected to target ports of other modules and a plurality of target ports connected to initiator ports of other modules. An internal port mapper for each internal module maps the global address to a certain internal module target port along the data path towards the second peripheral module.

27 Claims, 4 Drawing Sheets

MODULAR DATA TRANSFER ARCHITECTURE

BACKGROUND OF THE INVENTION

1. Technical Field of the Invention

The present invention relates to intra-chip data communication techniques for integrated circuit devices and, in particular, to a data transfer architecture useful for handling data communications between the computational blocks present within a system on chip (SoC) type integrated circuit device.

2. Description of Related Art

Advances in semiconductor technology allow complex systems composed of a plurality of computational blocks to be implemented on a single integrated circuit (IC) chip. Such devices are often referred to as system on chip (SoC) devices. Within such devices, it is critical to enable the transfer of data among and between the included computational blocks. However, the infrastructure which supports such intra-chip data transfers often becomes a bottleneck for speed performance with respect to the SoC device.

A prior art approach utilizes a global bus architecture for transferring data from a source computational block to a destination computational block. The global bus architecture solution, however, does not scale well as the number of blocks and the area of the SoC increases.

Although there are a number of different types of known global bus architectures, the concept of a global bus architecture solution can be simplified into a basic architecture. By considering this simplification, the limitations imposed by the global bus architecture solution can be evaluated.

Reference is now made to FIG. 1 wherein there is shown a block diagram of a basic global bus architecture 10. The bus architecture 10 may be used within an SoC device for purposes of interconnecting a plurality of computational blocks (not explicitly illustrated, see FIG. 2). Each computational block may act as a data initiator (i.e., a sender or transmitter), a data target (i.e., an acceptor or receiver), or both. To accomplish a communication as a data initiator, each computational block can access the bus architecture 10 through an initiator port 12 (n such ports being shown in FIG. 1). To accomplish a communication as a data target, each computational block can access the bus architecture 10 through a target port 14 (n such ports being shown in FIG. 1). The configuration of bus architecture 10 can thus support communications among and between n computational block (see, FIG. 2).

The bus architecture 10 includes an arbitration unit 16 and a data steering unit 18. The data steering unit 18 operates to control the flow of data from the data initiator (more specifically, the particular initiator port 12) to the data target (more specifically, the particular target port 14). In the bus architecture 10, the data steering unit 18 supports the connection of any initiator port 12 to any target port 14. The establishment of such connections is controlled by the arbitration unit 16 which assigns available communication resources within the data steering unit 18 to support a data transmission. More specifically, the arbitration unit 16 determines what access a certain initiator (from an initiator port 12) is to be given to a certain target (at a target port 14). The access determination decision is made by the arbitration unit 16 based on the availability of the target and the priority of the initiator. For example, the arbitration unit 16 may first determine whether the target is ready to receive the data communication (for example, is it available). Next, if more than one initiator has a need to make a data transfer to the ready and available target, the arbitration unit 16 determines which initiator port (or more specifically, which computational block) has a highest communications priority level. The initiator having the highest relative priority is then granted access through the bus architecture to communicate (through the date steering unit 18) with the target. This method of access arbitration requires the arbitration unit 16 to keep track of the availability status and relative priorities of all the computational blocks (targets and initiators) in the system. For an n x n system (i.e., one with n initiator ports and n target ports), the complexity of the arbitration unit 16 accordingly scales with n.

The data steering unit 18 controls the flow of data from initiator to target. Following the arbitration unit 16 granting an initiator (port) access to a specific target (port), the data steering unit 18 operates to transfer the data. The data steering unit 18 is configured in a bus format having communications resources which are allocated by the arbitration unit 16. Since any initiator (port) can connect to any target (port), for example through the use of an n plurality of n:1 multiplexers, the complexity of the data steering unit 18 also scales with n.

The scaling with n characterization of the both the arbitration unit 16 and data steering unit 18 is especially troublesome as the number of computational blocks increases with increased complexity of the SoC device design. Increases in n expose the weaknesses of the conventional bus architecture 10 solution.

The speed performance of the bus architecture 10 can be quantified in terms of data throughput (which is the reciprocal of the delay of the arbitration/data steering units). The delay in the arbitration/data steering units is composed of two components:

- a logic delay relating to the time taken by the included circuitry to perform the logic operations necessary to implement the functions performed by the arbitration and data steering units; and
- an interconnect delay relating to the time taken to establish communication connections from the blocks/ports to the arbitration and data steering units.

The logic delay of the arbitration and data steering units is a function of the number of devices, n. As the system scales, the number of logic devices needed increases and the data throughput is adversely affected by the time taken by the increased number of logic devices to perform the necessary data processing operations.

The interconnect delay is a function of the length of the wire, which is strongly affected by the physical implementation. Since the global bus architecture 10 operates on the signals from all the n blocks, it requires a physical implementation with a centralized placement of the arbitration and data steering units. The signals from all the blocks/ports are routed to this central location. This point is illustrated by FIG. 2 which shows a common floorplan for the global bus architecture utilizing centralized arbitration and data steering units. Due to the centralization requirement, as the area of the SoC increases, perhaps due to increases in the number n of included computational blocks, the interconnect length and hence the interconnect delay increases.

A need accordingly exists for an improved data communications architecture that supports the global connectivity requirements of an SoC with respect to a plurality of included computational blocks.

SUMMARY OF THE INVENTION

In accordance with an embodiment of the invention, a system on chip (SoC) integrated circuit comprises a plurality of computational blocks and a data transfer architecture. The architecture interconnects the plurality of computational blocks for intra-chip data communications and comprises a plurality of communications tiles each having a pipelining structure. The plurality of communications tiles are interconnected with each other, with certain ones of the communications tiles being interconnected to the plurality of computational blocks.

In accordance with another embodiment, a system on chip (SoC) integrated circuit comprises a plurality of computational blocks and a data transfer architecture. The blocks include an initiator block and a target block, wherein the initiator block originates a data communication having a global address associated with the target block. The data transfer architecture interconnects the plurality of computational blocks to enable transfer of the data communication from the initiator block to the target block using a data path established from the initiator block to the target block which hops across a plurality of tiles. Each tile includes initiator ports and target ports, with one of the initiator ports along the data path receiving the data communication. A port mapper for each tile maps the global address to one of the target ports along the data path which outputs the data communication towards the target block.

In accordance with another embodiment, a system on chip (SoC) integrated circuit comprises a plurality of computational blocks and a modular data transfer architecture. The blocks include an initiator block and a target block, with the initiator block originating a data communication having a global address associated with the target block. The modular data transfer architecture includes a first peripheral module having an initiator port connected to the initiator block to receive the data communication and a second peripheral module having a target port connected to the target block. The first peripheral module has a first port mapper that maps the global address to a first peripheral module target port along a data path towards the second peripheral module, and the second peripheral module has a second port mapper that maps the global address to the target port connected to the target block.

In accordance with yet another embodiment, a system on chip (SoC) integrated circuit comprises n computational blocks and a modular data transfer architecture. The n blocks include an initiator block and a target block, with the initiator block originating a data communication having a global address associated with the target block. The modular data transfer architecture supports intra-chip communications among and between the n computational blocks. The architecture includes a plurality of routing tiles, where each routing tile includes k ports, and k<n. The routing tiles are interconnected with each other and the computational blocks through their ports to support a plurality of possible data paths among and between the n computational blocks.

In accordance with embodiments of the invention, the modular data transfer architecture using basic building blocks achieves the global connectivity required within an SoC. The speed performance of the architecture, quantified in terms of the data throughput is independent of the number of blocks and the area of the SoC. The architecture also offers redundancy that can be exploited to work around defects in the fabricated SoC.

BRIEF DESCRIPTION OF THE DRAWINGS

A more complete understanding of the invention may be obtained by reference to the accompanying drawings wherein.

DETAILED DESCRIPTION OF THE DRAWINGS

Figure 3:
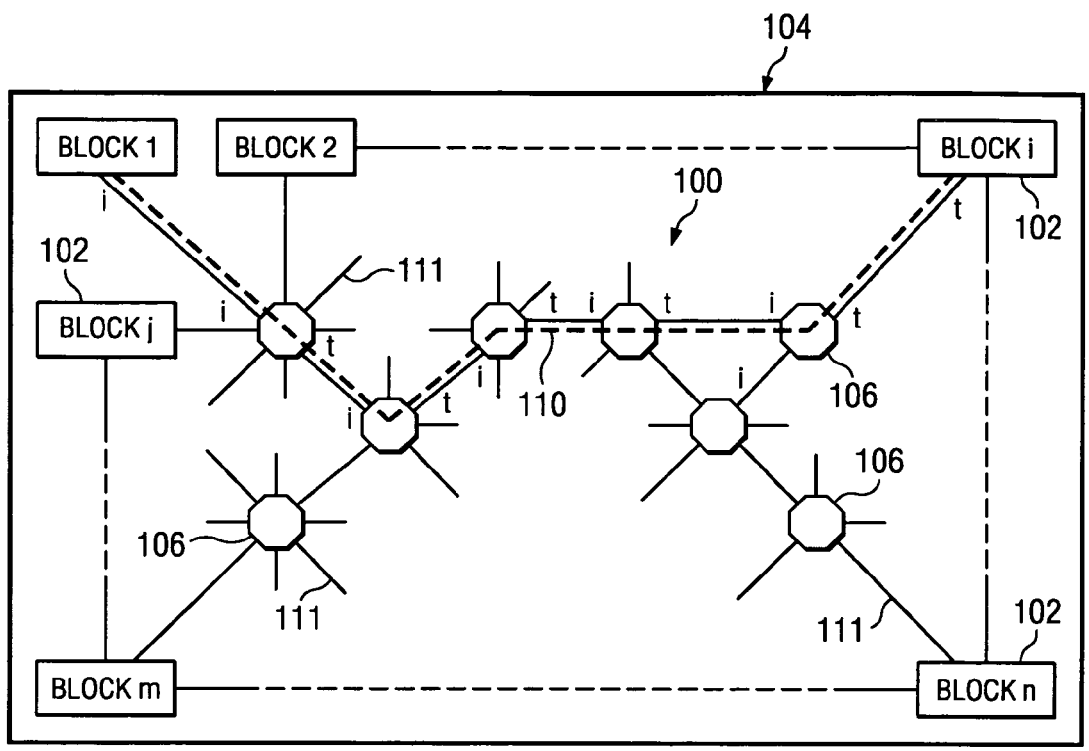
FIG. 3 is a block diagram of a data transfer architecture in accordance with an embodiment of the invention.

Reference is now made to FIG. 3 wherein there is shown a block diagram of a data transfer architecture (DTA) 100 in accordance with an embodiment of the invention. In an integrated circuit implementation, the data transfer architecture 100 is comprised of a collection of metal interconnects and logic circuits which are used to transfer data between computational blocks 102 in an SoC integrated circuit 104. In this context, an initiator block is a computational block 102 in the SoC IC 104 that can send (transmit or originate) data using the DTA 100. The port through which the block 102 accesses the DTA 100 will be referred to as the initiator port. A target block is a computational block 102 in the SoC IC 104 that can accept (receive or terminate) data from the DTA 100. The port through which the DTA 100 connects to the block 102 will be referred to as the target port. It will be understood that a single computational block may function as both an initiator block and a target block.

Data communications are effectuated over the DTA 100 using a data token which relates to a single data transaction between an initiator block and a target block. The target port/block is uniquely identified by a port address, and that address accompanies each data token.

The DTA 100 is implemented with a modular architecture composed of building modules/blocks called basic tiles 106 that are connected together to provide a desired connectivity among and between the included blocks 102. The network of basic tiles 106 included within the DTA 100 communicate with each other to realize the global routing of data from a given initiator to a given target. An example of such a routing is illustrated in FIG. 3 with respect to a communications path 110 shown in dotted lines which has been established by the DTA 100 between block 102(1) and block 102(i) using selected connectivity through a plurality of basic tiles 106.

Each basic tile 106 includes a plurality of ports 111. For example, each tile may have k ports 111 (where k is a design parameter that may be the same or different from tile to tile across the DTA 100). As shown in more detail in FIG. 4, these k ports 111 can be either or both initiator ports (i.e., a port at which the tile 106 receives data and initiates data communication across the tile) 112 and target ports (i.e., a port at which the through-tile communication terminates and the data communication is output from the tile) 114. The mix of initiator versus target ports at each tile 106 is configurable in accordance with the data communications needs of the DTA 100, but there are generally k number of each type port. The target port of the tile 106 is uniquely identified by a port address. While the block 102 port address accompanies each data token, the tile 106 port address is not associated with the data communication itself, but is instead used, as will be discussed in detail below, to effectuate a routing of the data communication across the tile from an initiator port 112 where the communication is received to a target port 114 where the communication is output. Generally speaking, the tile 106 port address designates which one of k possible target ports for the tile is the output destination for the data communication.

Because each of the blocks 102 and the tiles 106 when acting as a target for data communication transmission has a port address, the port address for a target block/port 102 in the SoC will be referred to as a "global" port address (where global refers to across the SoC), while the target port address for a basic tile 106 will be referred to as a "local" port address (where local refers to across the tile itself).

Interconnection of blocks 102 and tiles 106 is accomplished as follows. Each initiator port of a block 102 is connected to an initiator port of a tile 106. Conversely, with respect to certain ones of the tiles 106, a target port of that tile is connected to a target port of a block 102. The tiles 106 just mentioned may be referred to as peripheral interface tiles within the DTA 100. Additional (internal) tiles 106 are used within the DTA 100 to interconnect the peripheral tiles. These additional tiles 106 are connected such that an initiator port of such a tile is connected to a target port of another tile (peripheral or otherwise), while a target port of such a tile is connected to the initiator port of another tile (peripheral or otherwise). This is shown in FIG. 3, with respect to the communications path 110, wherein the designator "i" indicates an initiator port (for a block 102 or tile 106) while the designator "t" indicates a target port (for a block 102 or tile 106).

Each tile 106 includes a port mapping functionality (for example, in the form of a port mapping table, see FIG. 4) that operates to translate a global port address (as obtained from the received data communication) to a local port address (i.e., the target port of the tile 106 from which the received data communication will be output). This mapping information is unique to each basic tile 106, and is dependent on the position of that basic tile with respect to other basic tiles and blocks 102 in the DTA 100.

When a block 102 initiates a data transfer (from its initiator port and addressed to a global port address associated with the target block), that data communication is forwarded to the initiator port of a (peripheral) basic tile 106 connected to that block. That basic tile 106 uses its port mapping functionality to identify the local port address (for a target port of the tile) which corresponds to the global port address contained in data token of the data communication. Responsive thereto, the data communication is directed across the tile 106 to the target port for that local port address. The target port is connected to the initiator port of another tile 106 (peripheral or internal) which neighbors the first/peripheral. This neighboring basic tile 106 repeats the port mapping process and forwards the received data communication across the tile to the appropriate target port (associated with the mapped local port address). The forwarding and mapping process continues until the data communication reaches the peripheral tile 106 having a target port connected to the block 102 target port associated with the global port address. With reference to FIG. 3, the dotted line of data communication path 110 illustrates how a data communication originated at block 102(1) passes through several tiles 106 on route to its final global port addressed destination at block 102(i).

By design, k is typically much smaller than n (where n indicates the number of blocks/ports 102 in the SoC device). A basic tile (BT) 106 that supports k initiator/target ports is referred to as k-BT. Throughput performance is achieved in this implementation by localizing the arbitration/routing delay to that of each k-BT.

Figure 4:
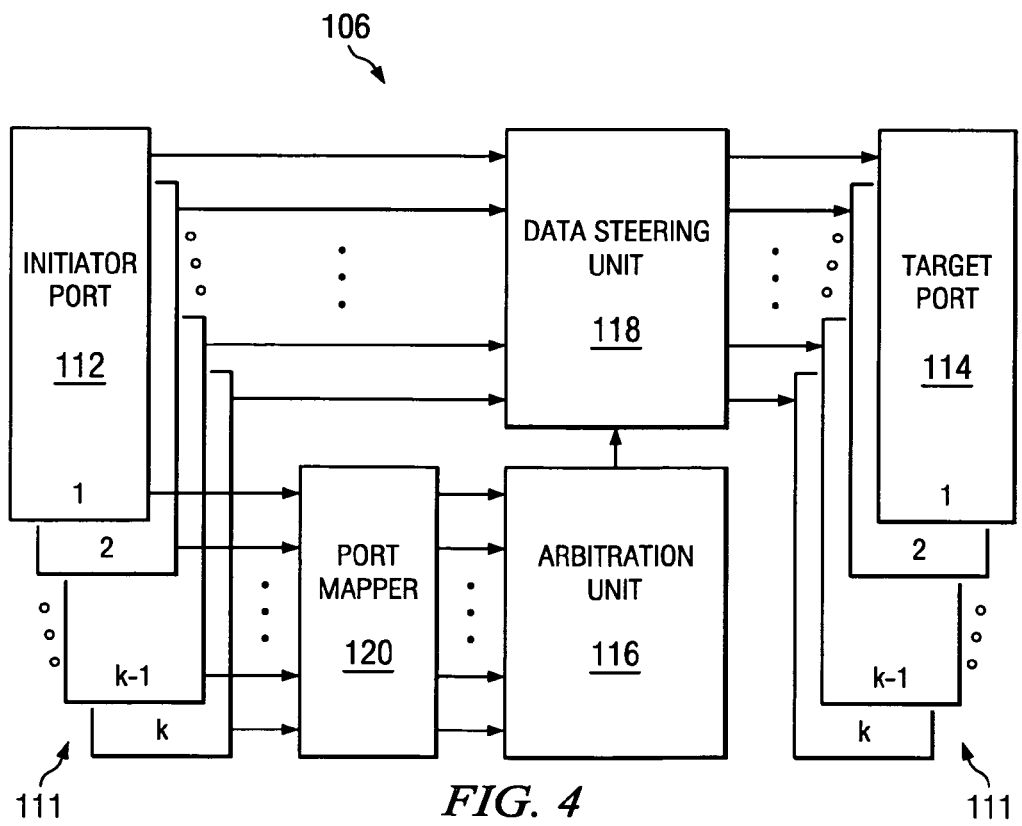
FIG. 4 is a block diagram of a basic tile within the data transfer architecture.

The DTA 100 utilizes pipelining at the level of the plurality of included tiles 106. A block diagram of a basic tile 106 is shown in FIG. 4. Each tile 106 includes an arbitration unit 116 and a data steering unit 118. The data steering unit operates to control the flow of data from the data initiator (more specifically, a particular one of the k initiator ports 112) to the data target (more specifically, a particular of the k target ports 114). The data steering unit 118 supports the connection of any initiator port 112 to any target port 114 using a functionality that may be thought of, for a k-BT, as k, k: 1 multiplexers. Each of the k ports 111 for the tile 106 can operate as an initiator port 112 and a target port 114 in parallel.

The establishment of connections across the tile 106 is controlled by the arbitration unit 116 which assigns available communication resources within the data steering unit 118 to support a data transmission. More specifically, the arbitration unit 116 determines what access a certain initiator (from an initiator port 112) is to be given to a certain target (at a target port 114). In a simple implementation, where m=1 for the port mapping functionality, the arbitration unit 116 needs to only check the availability of a single target port (local port address) for each data token of the received data communication. In a more flexible approach, where m>1 for the port mapping functionality, the arbitration unit 116 has to check the availability of each of the m target ports (local port addresses) to which the data token can be routed.

Figure 5:
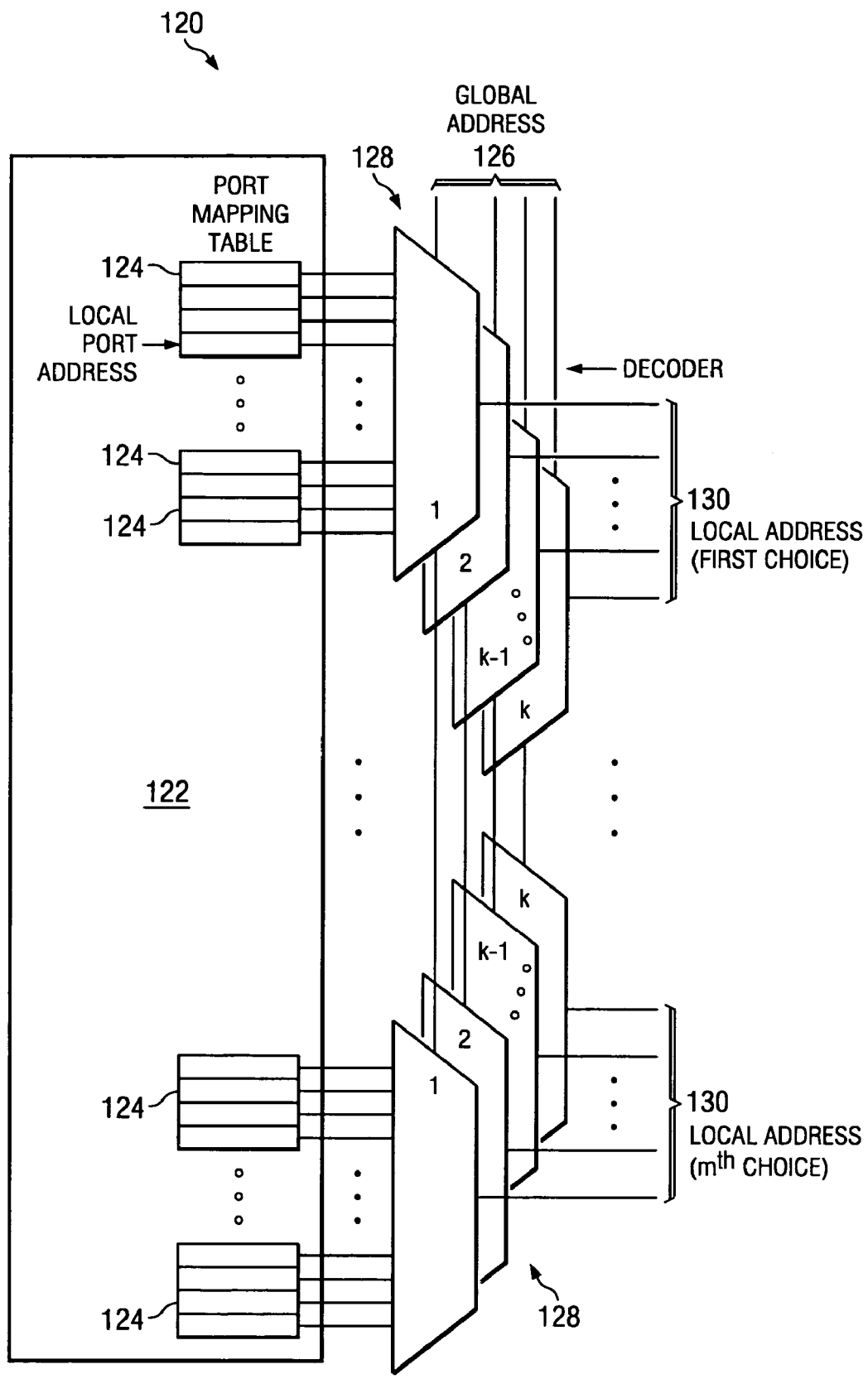
FIG. 5 is a block diagram of a port mapper within the basic tile.

The tile 106 further includes a port mapper 120 that operates to translate the global port address included in the data token to a local port address associated with a target port 114 to which the data has to be directed. FIG. 5 shows a block diagram of the port mapper 120. A port mapping table 122 stores at each table location 124, for m=1, a local port address for the tile 106 within which the port mapper 120 is located. For m>1, plural local port addresses will be stored in the table locations 124. These table locations 124 are accessed using the global address 126 from the data token received at the initiator port 112. A multiplexer circuit 128 is used to control the accessing of the table 122 in response to the global address 128 so as to output the m stored local port addresses 130. As discussed above, m=1 in a simple implementation where a received global address is mapped to one local port address 130. In a more flexible implementation, a received global address is mapped to m>1 local port addresses. The latter implementation enables the tile 106 to support alternate route (i.e., target port 114) designation for each global address and thus give the DTA 100 flexibility in routing of data communications (for example, if a route or communications path 110 associated with a given target port 114 of first choice is busy servicing another request or is otherwise not available).

The access determination decision is made by the arbitration unit 116 based on the availability of the target port 114 and the priority of the initiator port 112. For example, the arbitration unit 116 may first determine whether the target port 114 is ready for the data communication. Next, if more than one initiator port 112 has a need to make a data transfer to the ready and available target port 114, the arbitration unit 116 determines which initiator port has a highest communications priority level. The initiator port 112 having that priority is then granted access through the data steering unit 118 to communicate with the target port 114. With respect to the m>1 implementation, the arbitration unit 116 considers each of the m possible target ports 114 and chooses the best one for the communication based on availability. The arbitration unit 116 may further consider path length in making the determination between m>1 possible target ports 114.

Figure 6:
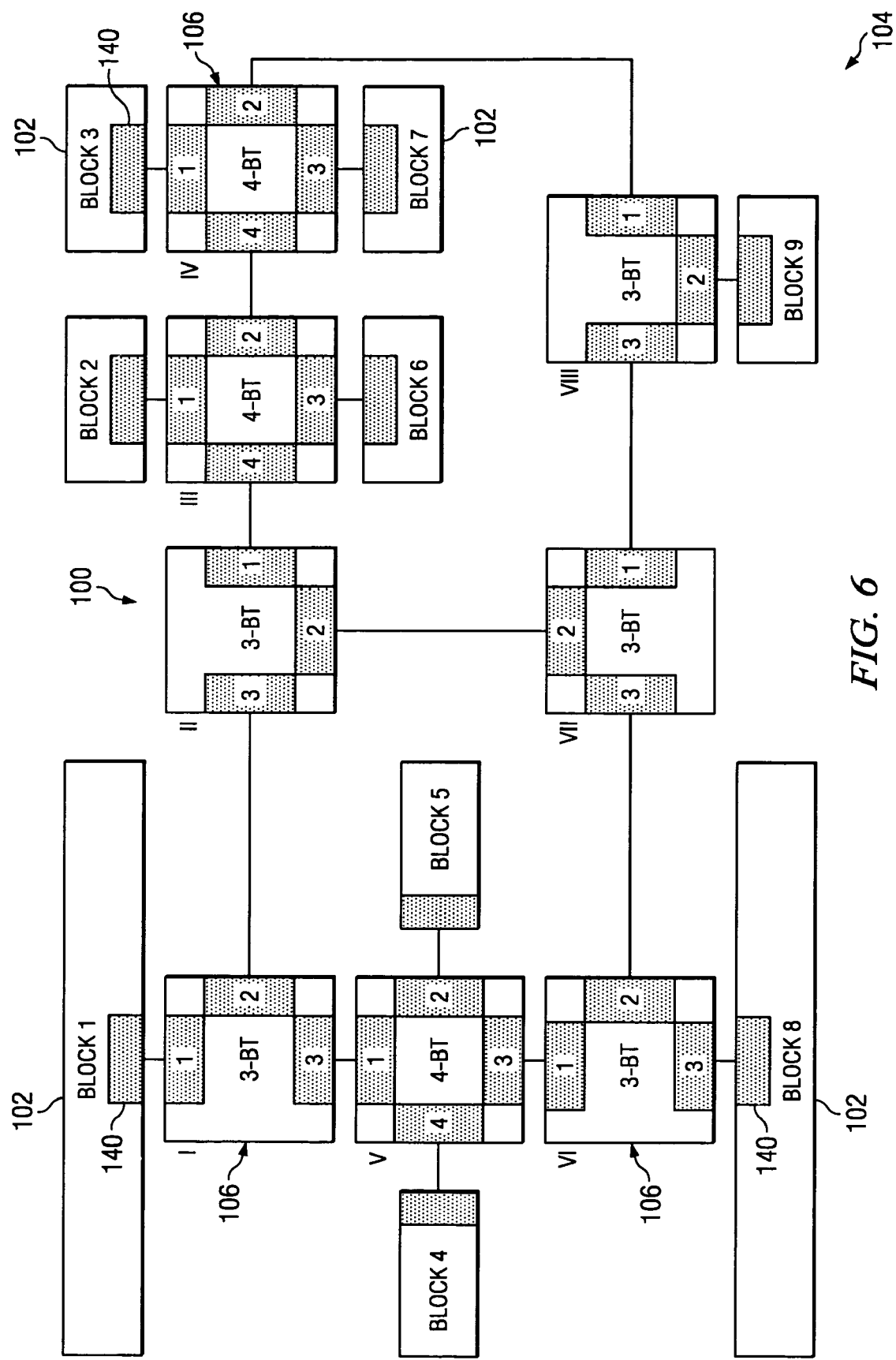
FIG. 6 illustrates an exemplary data transfer architecture configuration.

Reference is now made to FIG. 6 wherein there is shown an exemplary DAT 100 configuration. The composition and operation of the modular architecture provided through use of the tiles 106 may be better understood by examining this exemplary configuration. In the illustrated implementation of the DTA 100, a network of eight basic tiles 106 are interconnected to support communication among and between nine (n=9) blocks 102 of the SoC integrated circuit 104. Some basic tiles (for example, tiles 106(I), 106(II), 106(VI), 106 (VII) and 106(VIII)) have k=3 ports and are referred to as 3-BT devices, and other basic tiles (for example, tiles 106 (III), 106(IV) and 106(V)) have k=4 ports and are referred to as 4-BT devices. Each of the computational blocks 102 has one initiator port and one target port (collectively referred to as ports 140).

Operation of the DTA 100 proceeds in two stages: a first stage is initialization of the port mapping table, and a second stage is global data transfer. By separating initialization from the transfer operation itself, the DTA 100 can advantageously be programmed through the port mapping tables 122 of each tile 106 to support a customized (to a degree) communications configuration. This customization may account for issues such as resource contention and resource availability as will be described in more detail below.

Before any data transfer can take place, the contents of the port mapping table 122 in each port mapper 120 must be programmed through the first stage initialization process with the global to local port translation information. In this exemplary implementation of FIG. 6, a simple port mapper with m=1 will be used, and thus each global port address 126 is mapped within the port mapper 120 to only one local port address 130. It will, of course, be understood that a port mapping functionality with m>1 for some or all tiles 106 could equally well be supported in the implementation of FIG. 6.

For a better understanding of the port mapping functionality, attention is directed to Table 1 which provides one possible set of port mapper contents for the tiles 106 of the DTA 100 in an m=1 configuration.

TABLE 1

|        | 106 (I) | 106 (II) | 106 (III) | 106 (IV) | 106 (V) | 106 (VI) | 106 (VII) | 106 (VIII) |
|--------|---------|----------|-----------|----------|---------|----------|-----------|------------|
| addr 1 | 1       | 3        | 4         | 4        | 1       | 1        | 2         | 3          |
| addr 2 | 2       | 1        | 1         | 4        | 1       | 2        | 2         | 3          |
| addr 3 | 2       | 1        | 2         | 1        | 1       | 2        | 1         | 1          |
| addr 4 | 3       | 3        | 4         | 4        | 4       | 1        | 3         | 3          |
| addr 5 | 3       | 3        | 4         | 4        | 2       | 1        | 3         | 3          |
| addr 6 | 2       | 1        | 3         | 4        | 1       | 2        | 2         | 3          |
| addr 7 | 2       | 1        | 2         | 3        | 1       | 2        | 1         | 1          |
| addr 8 | 3       | 2        | 4         | 2        | 3       | 3        | 3         | 3          |
| addr 9 | 3       | 2        | 2         | 2        | 3       | 2        | 1         | 2          |

Each column represents the port mapping table for a different basic tile (with the Roman numeral identifying the particular tile). These contents are indexed with the global port addresses provided on the left hand side of Table 1. For example, with respect to tile 106(I), the included port mapper 120 will translate a global port address of 8 from the data token received at the initiator port 112 to a single (m=1) local port address of 3 which is associated with target port 114(3) of the tile 106(I).

Once the port mapper 120 has been programmed, the DTA and its tiles 106 are ready to engage in global data transfer operations. This may be better understood through the examination of an example. Assume that block 102(1) and block 102(4) wish to initiate data transfers to block 102(8) and block 102(9), respectively. Using the port mapper contents of Table 1, the communications paths taken by these transactions can be plotted. The flow of data across the tiles 106 is represented by the notation (tile #, initiator port, target port). Hence a data token routed from initiator port 1 to target port 4 of tile 106(III) will be represented by the notation (III, 1, 4).

Using this notation, the complete communications paths for each example may be defined as:

Block 1→(I, 1, 3)→(V, 1, 3)→(VI, 1, 3)→Block 8
Block 4→(V, 4, 3)→(VI, 1, 2)→(VII, 3, 1)→(VIII, 3, 2)→Block 9

In this example, it will be noted that at tile 106(V), both of the example communications paths are routed to and through the local target port 3. If these communications were contemporaneous, this could give rise to a contention issue with respect to the use of local target port 3 of tile 106(V). Any contention with respect to access and use of local target port 3 of tile 106(V) would be resolved by the arbitration unit 116 based on the priorities of the transactions (for example, which of blocks 102(1) and 102(4) has priority for communication).

As discussed above, throughput performance for systems like those described herein is affected by the complexity of the arbitration/data steering units and the interconnect length. For the embodiment of FIG. 3, arbitration and data routing operate at the basic tile 106 level (rather than on the global level), and thus scale with k which is the number of input/output ports 111 in the basic tile 106. Since k is designed to be much smaller than the global port count (i.e., n), the throughput performance of the system is much better than that of the traditional architecture of FIG. 1 which scales with n. Thus, with the DTA 100 implementation of FIG. 3, the designer can ensure that the throughput performance will be unaffected by the scaling of the number of blocks 102 in the system.

Figure 1:
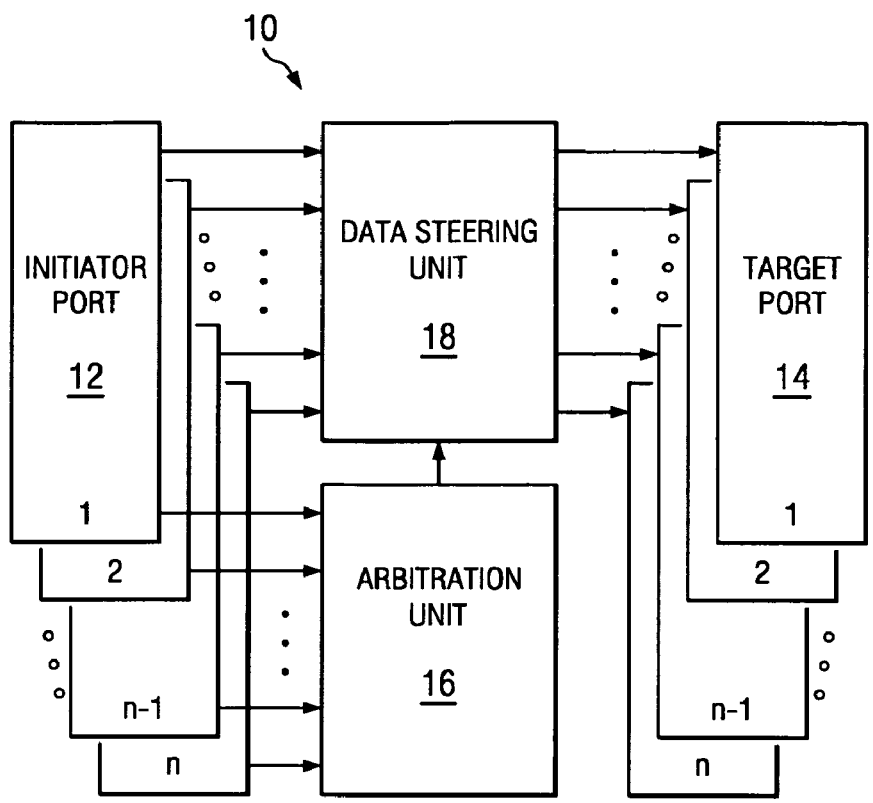
FIG. 1 is a block diagram of a basic global bus architecture.
Figure 2:
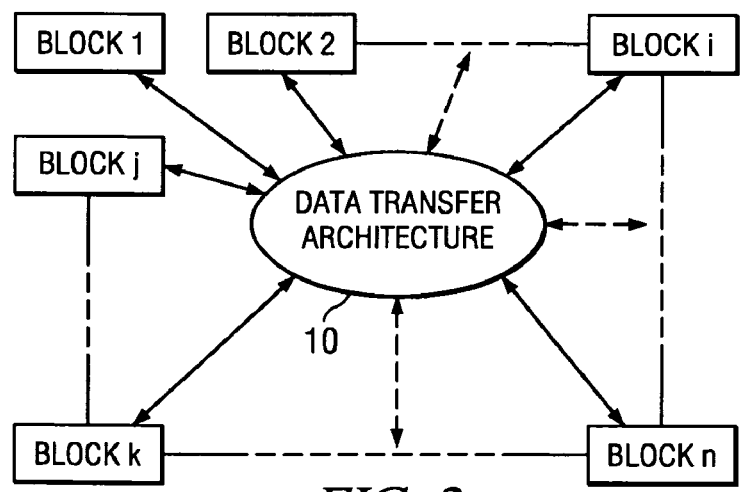
FIG. 2 is a floorplan for the global bus architecture utilizing centralized arbitration and data steering units.

Performance of the system of FIG. 3 is also improved over that of the system of FIG. 1 because the signals from each block 102 have to be routed only to the nearest basic tile 106 (i.e., peripheral tile). Because these peripheral tiles can be placed in close proximity to the block, the average interconnect length is much shorter than that of the traditional architecture. This advantageously reduces the interconnect delay considerably.

One point to be noted is that the transaction latency is dependent on the path each transaction takes. For the sample composition shown in FIG. 6 and the port mapping in Table 1, a transaction between block 102(4) and block 102(5) has a latency of one, while a transaction between block 102(3) and block 102(8) has a latency of four.

It is accordingly readily apparent that the modular tile 106 interconnect structure of the DTA 100 of FIG. 3 helps to improve throughput performance while remaining relatively unaffected by changes in the number of blocks 102 in the system and/or the area of the SoC 104.

The DTA 100 architecture of FIG. 3 also offers an additional feature wherein it is capable of adapting its routing to work around resource contention and defect issues within the fabricated SoC 104. This additional feature is accomplished through a reprogramming of the port mapping table 122 contents.

An example was previously discussed concerning a contention for the use of local port 3 of tile 106(V). A proposed solution involved arbitration to resolve the contention in favor of the communication having the higher priority. A questions remains, however, as to what to do in the event both of these communication transactions are critical and/or perhaps occur continuously. In such a situation, performance of the system is degraded as one of the communications will lose the contention battle for communications resources.

To address this problem, it is possible to reprogram the port mapping table 122 contents with respect to one or more of the tiles 106 such that the competing communication transactions do not compete for resources within the DTA 100. For example, the mapping specification for tile 106(I) can be modified so that the transaction from block 102(1) to block 102(9) would take a different path and avoid the conflict at tile 106(V). The port mapping table 122 for tile 106(I) can be modified such that the entry corresponding to global port address 9 instead specifies the local port address 2. The new path is given by:

Block 1→(I, 1, 2)→(II, 3, 2)→(VII, 2, 3)→(VI, 2, 3)→Block 8.

Thus, a rerouting is provided such that a conflict at tile 106(V) is avoided. Notably, this modification can be achieved through the first stage initialization process at any time.

As the preferred implementation of the SoC 104 is in the form of an integrated circuit (IC), a concern exists with respect to process defects affecting the usability of the IC. The risk of a fabrication defect increases with the use of the latest processing technologies and the movement towards smaller feature sizes and smaller area chips. It is known in the prior art to include redundant circuits on the IC design and then make use of those redundant circuits to replace circuits found to be process defective. This technique has been used successfully with many memory circuit designs to replace memory rows/columns of memory cells. As a given system becomes larger, the defect problem is aggravated. Additionally, with an SoC it is impractical with respect to many computational blocks, or the intra-chip communications network, to include redundant features. There would be an advantage if the design of a system could allows for working around defects so that device yields could dramatically improve.

The modular architecture of the data transfer architecture DTA 100 can be programmed to work around certain defects which arise. For example, assume that the routing between tile 106(III) and tile 106(IV) in the exemplary design of FIG. 6 is defective. By reprogramming the contents of the port mapping table 122 for each of tiles 106(II), 106(III) and 106(IV) at the first stage initialization process, the dependency within the DTA 100 on this defective path can be removed. Table 2 shows the port mapping tables 122 for the tiles 106 following an adjustment to deal with the defect.

TABLE 2

|        | 106 (I) | 106 (II) | 106 (III) | 106 (IV) | 106 (V) | 106 (VI) | 106 (VII) | 106 (VIII) |
|--------|---------|----------|-----------|----------|---------|----------|-----------|------------|
| addr 1 | 1       | 3        | 4         | 2*       | 1       | 1        | 2         | 3          |
| addr 2 | 2       | 1        | 1         | 2*       | 1       | 2        | 2         | 3          |
| addr 3 | 2       | 2*       | 4*        | 1        | 1       | 2        | 1         | 1          |
| addr 4 | 3       | 3        | 4         | 2*       | 4       | 1        | 3         | 3          |
| addr 5 | 3       | 3        | 4         | 2*       | 2       | 1        | 3         | 3          |
| addr 6 | 2       | 1        | 3         | 2*       | 1       | 2        | 2         | 3          |
| addr 7 | 2       | 2*       | 4*        | 3        | 1       | 2        | 1         | 1          |
| addr 8 | 3       | 2        | 4         | 2        | 3       | 3        | 3         | 3          |
| addr 9 | 3       | 2        | 4*        | 2        | 3       | 2        | 1         | 2          |

The asterisk (*) next to a local port address indicates an address that was modified from the address given in Table 1 in order to account for the work around and avoid use of the defective communications path between tile 106(III) and tile 106(IV).

In summary, the DTA 100 proposes the use of a modular data transfer architecture using a distributed network of basic tiles 106 to achieve global transfer of data. By localizing data routing decisions to each basic tile 106, throughput performance is improved compared to a traditional global bus architecture such as that shown in FIG. 1. The flexible nature of the architecture allows for adaptive control over the routing of transactions. This can be used to work around manufacturing defects and thus improve device yield. Additionally, knowledge of transaction patterns can be exploited to avoid resource contention by rerouting data communications through less congested paths.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A system on chip (SoC) integrated circuit, comprising:
a plurality of computational blocks, each computational block having a port with an associated global port address; and
a data transfer architecture interconnecting ports of the plurality of computational blocks for intra-chip data communications, the data transfer architecture comprising a plurality of communications tiles, the plurality of communications tiles being interconnected with each other, with certain ones of the communications tiles being interconnected to ports of the plurality of computational blocks;
wherein each communications tile includes a plurality of communications ports, certain ones of the communications ports being connected to communications ports of adjacent communications tiles in the data transfer architecture;
wherein the plurality of communications ports for each communications tile include initiator ports and target ports interconnected with each other through a data steering unit, the initiator ports receiving a data communication addressed for transmission toward the port of an addressed destination computational block which is assigned a destination computational block global port address; and
wherein each communications tile includes a port mapper, the port mapper operating to map the destination computational block global port address from the data communication received at that communications tile to a communications tile local target port address for a selected one of the target ports included in that same communications tile from which the initiator port received data communication is to be output for communication through the data transfer architecture towards the port of the destination computational block; and
an arbitration unit at each communications tile controlling the operation of the data steering unit in response to the communications tile local target port address mapped by the port mapper so as to interconnect the initiator port to the selected target port.

2. The circuit of claim 1 wherein the received data communications comprise a data token, the data token including the global port address, the global port address designating a certain port and one of the computational blocks as the destination of the data communication.

3. The circuit of claim 1 wherein the global port address designates a certain port and one of the computational blocks as the destination of the data communication.

4. The circuit of claim 1 wherein the received data communication is output from the selected one of the target ports to the initiator port of an adjacent communications tile along a communications path towards a certain port and one of the computational blocks which is associated with the global port address and is the destination of the data communication.

5. The circuit of claim 1 wherein the received data communication is output from the selected one of the target ports to a certain port and one of the computational blocks which is associated with the global port address and is the destination of the data communication.

6. A system on chip (SoC) integrated circuit, comprising:
a plurality of computational blocks including an initiator block and a target block, the initiator block originating a data communication having a destination target block global port address associated with a port of a destination target block which is a communication destination of the data communication; and
a data transfer architecture interconnecting the plurality of computational blocks to enable transfer of the data communication from the initiator block to the destination target block, the data transfer architecture establishing a data path from the initiator block to the destination target block which hops across a plurality of tiles, each tile including initiator ports and target ports, wherein initiator ports of tiles along the data path receive the data communication, and each tile further including a port mapper that maps the destination target block global port address of the destination target block port from the data communication received at the initiator port of that tile to a local tile target port address for one of the tile target ports included in that same tile which outputs the data communication along the data path towards the destination target block.

7. The circuit of claim 6 wherein certain ones of the initiator ports and target ports of each tile are connected to target ports and initiator ports, respectively, of adjacent tiles in the data transfer architecture.

8. The circuit of claim 6 wherein an initiator port of a certain one of the tiles is connected to the initiator block, and a target port of a certain other one of the tiles is connected to the port of the destination target block.

9. The circuit of claim 6 wherein the data communication comprises a data token, the data token including the global port address of the destination target block port.

10. A system on chip (SoC) integrated circuit, comprising:
a plurality of computational blocks including an initiator block and a destination target block, the initiator block originating a data communication having a destination target block global port address assigned to a port of the destination target block; and
a modular data transfer architecture, including a first peripheral module having a first peripheral module initiator port connected to the initiator block to receive the data communication therefrom and a second peripheral module having a second peripheral module target port connected for delivery of the data communication to the destination target block, the first peripheral module having a first port mapper that maps the destination target block global port address from the data communication received at a first peripheral module initiator port of the first peripheral module to a local target port address of a target port in that same first peripheral module along a data path towards the second peripheral module and the destination target block, and the second peripheral module having a second port mapper that maps the destination target block global port address from the data communication received at a second peripheral module initiator port of the second peripheral module to a local target port address of the target port in that same second peripheral module which is connected to the destination target block port assigned the destination target block global port address.

11. The circuit of claim 10 wherein the modular data transfer architecture further includes a plurality of internal modules, each internal module having a plurality of internal module initiator ports connected to target ports of other modules, and having a plurality of internal module target ports connected to initiator ports of other modules.

12. The circuit of claim 11 wherein the data path passes through at least one of the internal modules.

13. The circuit of claim 12 wherein the at least one of the internal modules includes an internal module port mapper that maps the destination target block global port address of the data communication received at a first internal module initiator port to a local target port address of an internal module target port along the data path towards the second peripheral module and the destination target block.

14. The circuit of claim 10 wherein the data communication comprises a data token, the data token including the destination target block global port address.

15. The circuit of claim 10 wherein each of the modules comprises a pipelining communications structure.

16. A system on chip (SoC) integrated circuit, comprising:
a plurality of computational blocks including an initiator block and a destination target block, the initiator block originating a data communication having a destination target block global port address assigned to a port of the destination target block; and
a modular data transfer architecture for supporting intra-chip communications among and between the n computational blocks, the architecture including a plurality of routing tiles, each routing tile including k ports, where k is less than the number of computational blocks, the routing tiles being interconnected with each other and the computational blocks through their ports to support a plurality of possible data paths among and between the plurality computational blocks;
wherein each routing tile includes a port mapper that maps the destination target block global port address from a data communication received by that routing tile to a routing tile local port address for a certain one of the k ports included in that same routing tile from which the received data communication is output along one of the possible data paths towards the destination target block port having the assigned destination target block global port address.

17. The circuit of claim 16 wherein k is not the same for all routing tiles.

18. The circuit of claim 16 wherein the k ports include initiator ports and target ports, the initiator port receiving a data communication and the target port outputting the data communication for transmission along the data path.

19. The circuit of claim 16 wherein the plurality of routing tiles includes peripheral tiles connected to the computational blocks, and internal tiles interconnecting the peripheral tiles.

20. The circuit of claim 19 wherein the data path passes through at least one of the internal modules.

21. The circuit of claim 6 wherein k is substantially less than the plurality of computational blocks.

22. The circuit of claim 6 wherein each of the routing tiles comprises a pipelining communications structure.

23. The circuit of claim 1 wherein the data steering unit connects the initiator port receiving the data communication to the selected one of the target ports in the communications tile which has the communications tile local target port address mapped by the port mapper from the destination computational block global port address for the received data communication.

24. The circuit of claim 23 wherein the arbitration unit controls the connection operation performed by the data steering unit based on the mapped target port address and arbitrates conflicting accesses by plural initiator ports to a single one of the target ports.

25. The circuit of claim 6 wherein each tile further includes a data steering unit coupled between the initiator ports and target ports of the communications tile, the data steering unit connecting the initiator port receiving the data communication to the one of the target ports having the local target port address mapped by the port mapper from the destination target block global port address for the received data communication.

26. The circuit of claim 10 wherein each peripheral module further includes a data steering unit coupled between the initiator port and target port of the peripheral module, the data steering unit selectively connecting the initiator port receiving the data communication to the target port having the local target port address mapped by the port mapper from the destination target block global port address for the received data communication.

27. The circuit of claim 16 wherein each routing tile further includes a data steering unit coupled between the k ports of the routing tile, the data steering unit connecting an initiator one of the k ports which receives the data communication to a selected target one of the k ports having the routing tile local port address mapped by the port mapper from the destination target block global port address for the received data communication.

* * * * *

UNITED STATES PATENT AND TRADEMARK OFFICE
CERTIFICATE OF CORRECTION

PATENT NO. : 7,664,891 B2 Page 1 of 1
APPLICATION NO. : 11/005926
DATED : February 16, 2010
INVENTOR(S) : Varghese George It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 857 days.

Signed and Sealed this

Twenty-eighth Day of December, 2010

David J. Kappos
*Director of the United States Patent and Trademark Office*